(12) United States Patent
Fujii et al.

(10) Patent No.: US 6,410,653 B1
(45) Date of Patent: Jun. 25, 2002

(54) HIGHLY SATURATED CARBOXYLATED NITRILE COPOLYMER RUBBER AND PROCESS FOR THE PRODUCTION THEREOF

(75) Inventors: Yoshinori Fujii; Atsumi Ikeda, both of Kawasaki (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/269,289

(22) PCT Filed: Sep. 18, 1997

(86) PCT No.: PCT/JP97/03294

§ 371 (c)(1),
(2), (4) Date: Mar. 25, 1999

(87) PCT Pub. No.: WO98/13390

PCT Pub. Date: Apr. 2, 1998

(30) Foreign Application Priority Data

Sep. 27, 1996 (JP) ............................................. 8-277015
Mar. 28, 1997 (JP) ............................................. 9-094874

(51) Int. Cl.$^7$ ......................... C08C 19/36; C08L 13/00; C08L 9/02
(52) U.S. Cl. .................... 525/285; 525/329.3; 525/339; 525/386
(58) Field of Search ............................. 525/285, 329.3, 525/339, 386

(56) References Cited

U.S. PATENT DOCUMENTS 5,082,900 A * 1/1992 Kuroda et al. .............. 525/211
5,157,083 A * 10/1992 Aonuma et al. ............ 525/285

FOREIGN PATENT DOCUMENTS

| EP | 0 324 860 | 6/1988 |
| GB | 1119629 | 7/1968 |
| JP | 62 42937 | 2/1987 |
| JP | 62 125858 | 6/1987 |
| JP | 64 6039 | 1/1989 |
| JP | 64 45402 | 2/1989 |
| JP | 64 45403 | 2/1989 |
| JP | 64 45404 | 2/1989 |
| JP | 64 45405 | 2/1989 |
| JP | 3 252405 | 11/1991 |
| JP | 6 37576 | 5/1994 |
| JP | 6 286015 | 10/1994 |
| JP | 7 196116 | 8/1995 |
| JP | 8 32801 | 3/1996 |

OTHER PUBLICATIONS

Whelan, "Polymer Technology Dictionary", $2^{nd}$ ed., Chapman & Hall, New York, p. 209 (1997).*
ASTM Test method D 5554—95, "Standard Test Method for Determinaton of the Iodine Value of Fats and Oils", American Society of Testing Materials, Philadelphia, PA (1995).*

* cited by examiner

*Primary Examiner*—D. R. Wilson
(74) *Attorney, Agent, or Firm*—Armstrong, Westerman & Hattori, LLP

(57) ABSTRACT

The invention relates to a carboxylated nitrile group-containing copolymer rubber having the following physical properties:

(a) the acid equivalent being at least $1 \times 10^{-4}$ ephr,
(b) the ratio of [peak height of a carboxylic acid anhydride group]/([peak height of the carboxylic acid anhydride group]+[peak height of a carboxyl group]) in its infrared absorption analysis being at least 0.5,
(c) the Mooney viscosity being 15 to 200, and
(d) the iodine value being at most 80 grams per 100 grams, and a production process thereof.

7 Claims, 3 Drawing Sheets

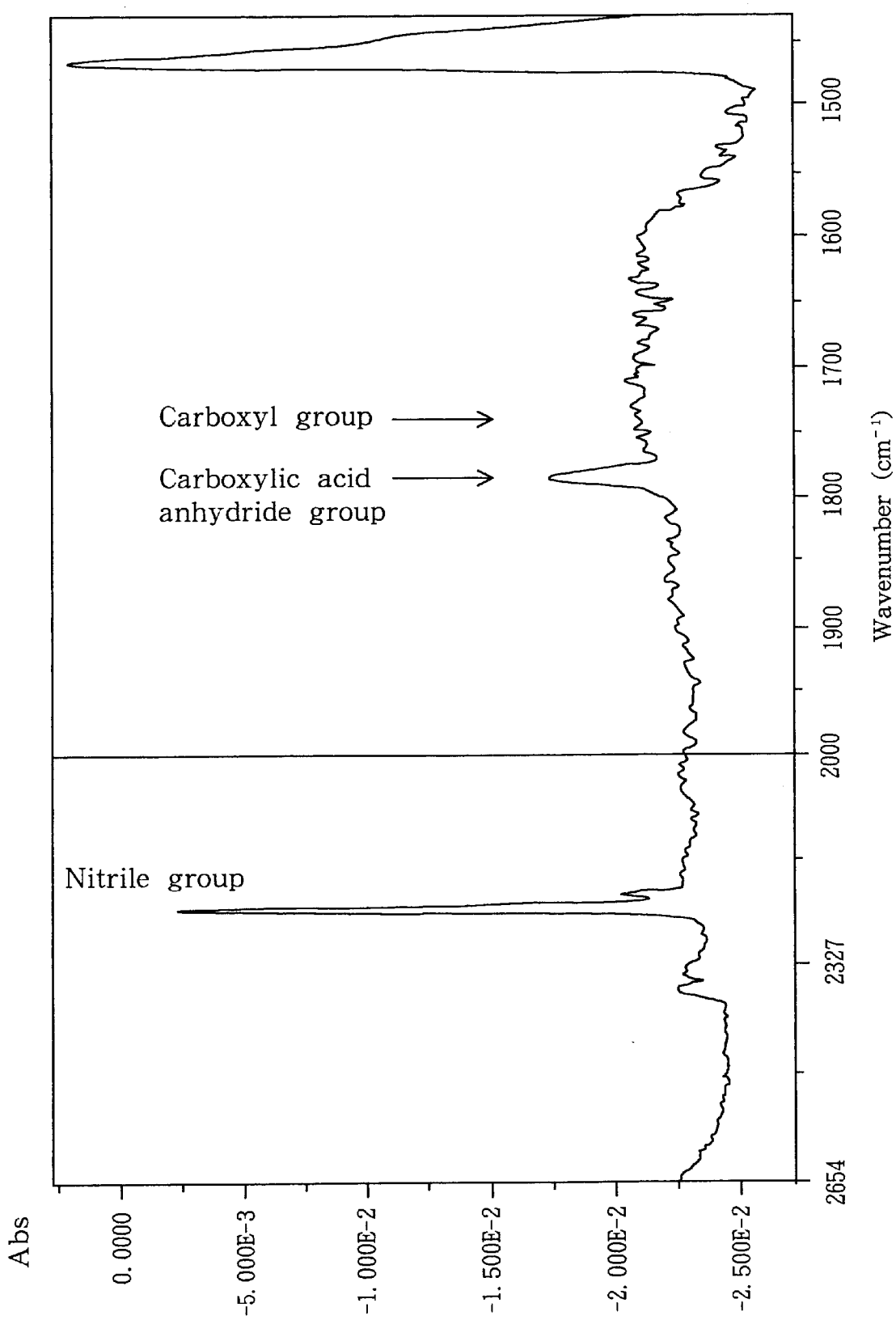

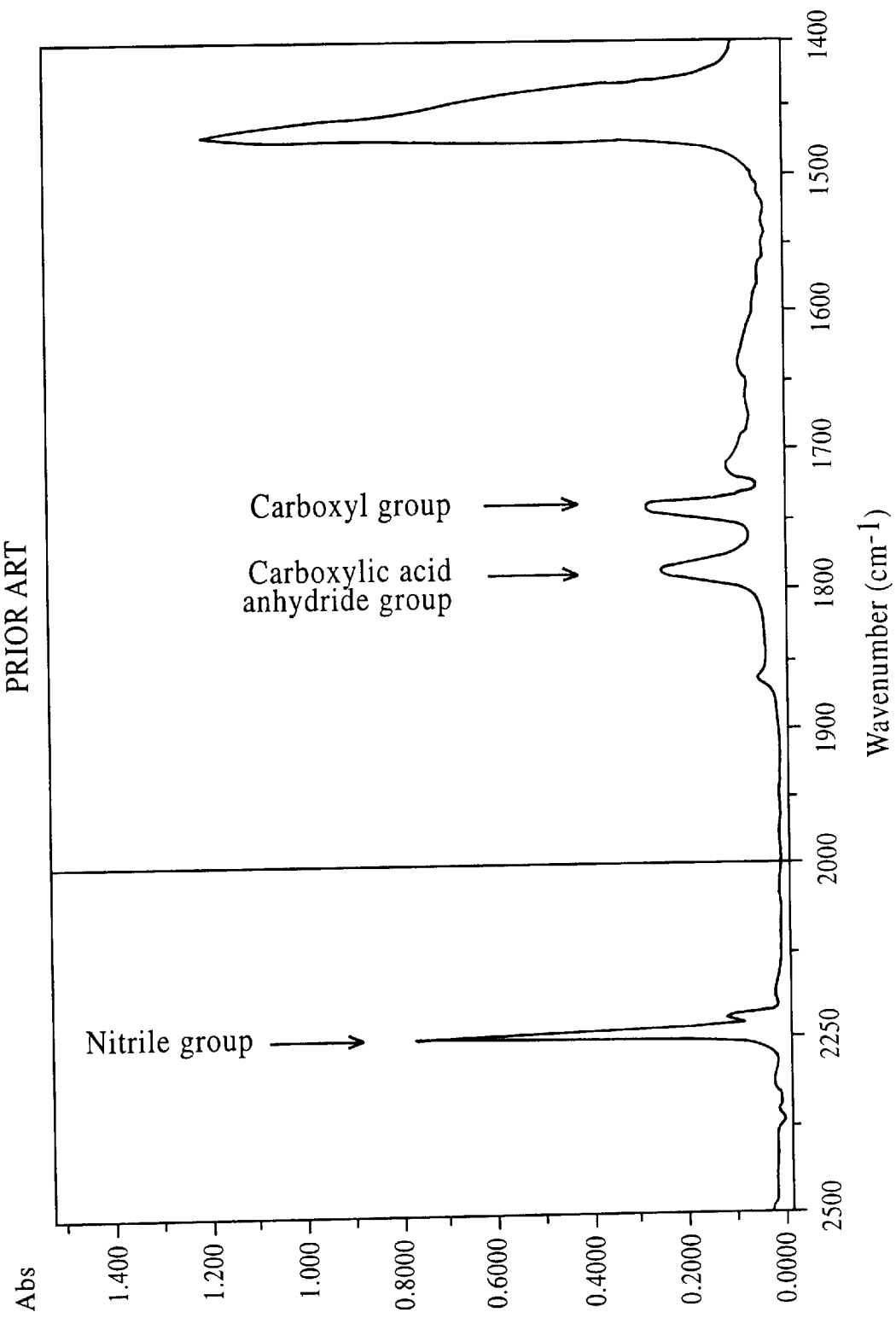

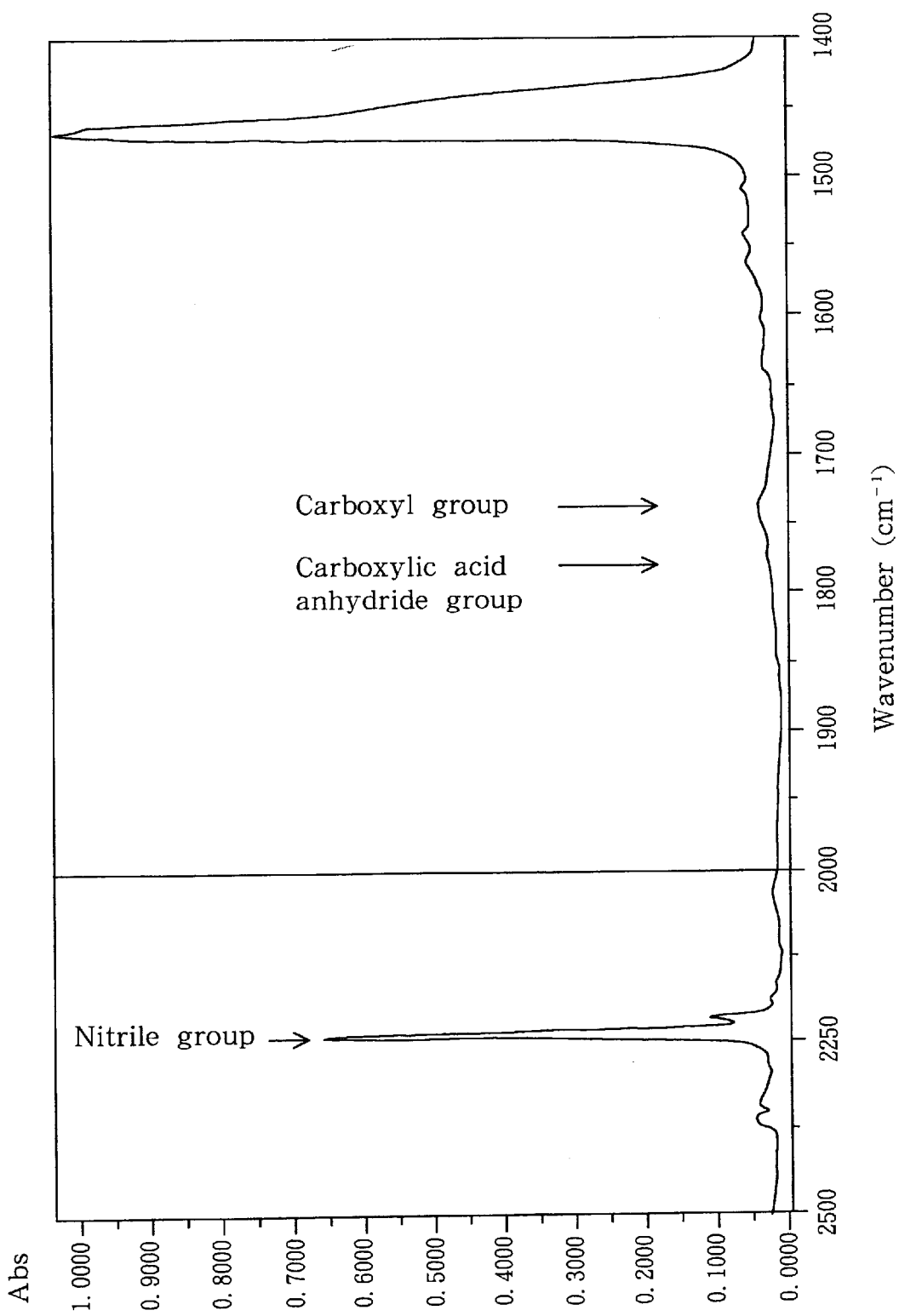

HIGHLY SATURATED CARBOXYLATED NITRILE COPOLYMER RUBBER AND PROCESS FOR THE PRODUCTION THEREOF

TECHNICAL FIELD

The present invention relates to a carboxylated nitrile group-containing highly saturated copolymer rubber, and a production process thereof, and more particularly to a carboxylated nitrile group-containing highly saturated copolymer rubber which is well balanced between abrasion resistance and strength properties and hard to undergo scorching, and a production process thereof.

BACKGROUND ART

A nitrile group-containing highly saturated copolymer rubber obtained by hydrogenating carbon-carbon double bonds in acrylonitrile-butadiene copolymer rubber to saturate it to a high degree is known as a rubber balanced among oil resistance, heat resistance, weather resistance, cold resistance and mechanical strength, and is used in, for example, application fields of belts and hoses. In recent years, such rubber has been required to improve the strength properties at both ordinary temperature and high temperature thereof to a higher level even in such application fields from the viewpoint of long-term use. In the application field of, for example, belts, it has been proposed to use a nitrile group-containing highly saturated copolymer rubber with maleic anhydride added thereto in order to more ensure the transmission of power (Japanese Patent Application Laid-Open No. 6039/1989).

Examples of a process for adding maleic anhydride to the nitrile group-containing highly saturated copolymer rubber include (1) a process in which an addition reaction is conducted in a solution state in a chemical reactor such as an autoclave, (2) a process in which a thermal addition reaction is conducted in a solid phase state using a mixing and processing machine such as a kneading extruder, and (3) a process in which a radical-type addition reaction is conducted in an internal kneader using a peroxide. However, the process (1) is expensive in production cost and moreover low in productivity. The process (2) involves problems of formation of burned matter, gel formation, mixing of the formed gel into a product, etc., and moreover tends to cause clogging of a die head due to gelling of a holdup at the outlet of the extruder, and so involves a problem of continuous productivity. In addition, the process (2) is difficult to remove unreacted maleic anhydride which remains in the rubber modified. The process (3) tends to cause gel formation.

As described above, there has not been yet found under the circumstances any production process which can industrially satisfy as to the process for adding maleic anhydride to the nitrile group-containing highly saturated copolymer rubber.

Further, the maleic anhydride-added nitrile group-containing highly saturated copolymer rubbers (i.e., typical examples of "carboxylated nitrile group-containing highly saturated copolymer rubber") obtained by these conventional processes have involved a problem that they are poor in winding tendency on a roll and low in processability. Such rubber is liable to undergo scorching due to its high reaction rate to a crosslinking aid such as zinc oxide, and so its molding or forming and processing ability is poor. The rubber has not sufficiently satisfied physical properties such as abrasion resistance and tensile strength which are required for belts and hoses.

DISCLOSURE OF THE INVENTION

It is an object of the present invention to provide a carboxylated nitrile group-containing highly saturated copolymer rubber which is excellent in tensile strength and abrasion resistance and high in adhesive strength to fiber, and a production process thereof.

Another object of the present invention is to provide a carboxylated nitrile group-containing highly saturated copolymer rubber which is hard to undergo scorching and excellent in processability into a roll, and a production process thereof.

A further object of the present invention is to provide a rubber composition comprising, as essential components, the carboxylated nitrile group-containing highly saturated copolymer rubber having such excellent various properties and a crosslinking agent.

A still further object of the present invention is to provide a composite comprising the above rubber composition and fiber.

The present inventors have carried out an extensive investigation with a view toward overcoming the above-described problems involved in the prior art. As a result, it has been found that in the maleic anhydride-added nitrile group-containing highly saturated copolymer rubbers obtained by the conventional processes, almost all the maleic anhydride groups added change to carboxyl groups. The present inventors have inferred that such addition state of the maleic anhydride group causes such problems as described above.

Therefore, the present inventors have carried out a further investigation as to the addition states of carboxylic acid anhydride groups and carboxyl groups, and addition reaction mechanisms in reactions for carboxylating nitrile group-containing highly saturated copolymer rubbers with an ethylenically unsaturated dicarboxylic acid or an anhydride thereof such as maleic anhydride. As a result, it has been found that the above objects can be achieved by carboxylated nitrile group-containing highly saturated copolymer rubbers in which proportions of the carboxylic acid anhydride groups and carboxyl groups added fall within respective specific ranges.

The carboxylated nitrile group-containing highly saturated copolymer rubbers having such excellent various properties can be obtained by conducting the ene-type addition reaction of a nitrile group-containing highly saturated copolymer rubber (hydrogenated acrylonitrile-butadiene copolymer rubber) with an ethylenically unsaturated dicarboxylic acid or an anhydride thereof (for example, maleic anhydride) under specific reaction conditions. The present invention has been led to completion on the basis of these findings.

According to the present invention, there is thus provided a carboxylated nitrile group-containing copolymer rubber having the following physical properties:

(a) the acid equivalent being at least $1 \times 10^{-4}$ ephr,
(b) the ratio of [peak height of a carboxylic acid anhydride group]/([peak height of the carboxylic acid anhydride group]+[peak height of a carboxyl group]) in its infrared absorption analysis being at least 0.5,
(c) the Mooney viscosity being 15 to 200, and
(d) the iodine value being at most 80 grams per 100 grams.

According to the present invention, there is also provided a process for producing a carboxylated nitrile group-containing highly saturated copolymer rubber by additionally reacting a nitrile group-containing highly saturated copolymer rubber with an ethylenically unsaturated dicarboxylic acid or an anhydride thereof, the process comprising the steps of:

(1) feeding the nitrile group-containing highly saturated copolymer rubber to an internal hot kneader and heating and kneading the rubber to control the temperature of the rubber within a range of 60 to 170° C., (2) feeding the ethylenically unsaturated dicarboxylic acid or the anhydride thereof to the kneader while the rubber temperature falls within the range of 60 to 170° C. to continue the kneading, and (3) controlling the rubber temperature within a range of 200 to 280° C. to additionally react the nitrile group-containing highly saturated copolymer rubber with the ethylenically unsaturated dicarboxylic acid or the anhydride thereof.

According to the present invention, there is further provided a rubber composition comprising, as essential components, (A) a carboxylated nitrile group-containing copolymer rubber having the following physical properties:

(a) the acid equivalent being at least $1 \times 10^{-4}$ ephr, (b) the ratio of [peak height of a carboxylic acid anhydride group]/([peak height of the carboxylic acid anhydride group]+[peak height of a carboxyl group]) in its infrared absorption analysis being at least 0.5, (c) the Mooney viscosity being 15 to 200, and (d) the iodine value being at most 80 grams per 100 grams.

(B) a crosslinking agent.

According to the present invention, there is provided a composite comprising the above rubber composition and fiber combined with each other.

BRIEF DESCRIPTION OF THE DRAWINGS

FIG. 1 illustrates a spectrum obtained by the infrared absorption analysis of a carboxylated nitrile group-containing highly saturated copolymer rubber according to the present invention obtained in Example 1.

FIG. 2 illustrates a spectrum obtained by the infrared absorption analysis of a conventional carboxylated nitrile group-containing highly saturated copolymer rubber obtained in Comparative Example 1.

FIG. 3 illustrates a spectrum obtained by the infrared absorption analysis of hydrogenated acrylonitrile-butadiene copolymer rubber used as a nitrile group-containing highly saturated copolymer rubber in Example 1.

BEST MODE FOR CARRYING OUT THE INVENTION

Carboxylated Nitrile Group-containing Highly Saturated Copolymer Rubber

The carboxylated nitrile group-containing highly saturated copolymer rubber according to the present invention is a rubber having the following physical properties: the acid equivalent being at least $1 \times 10^{-4}$ ephr, the ratio of [peak height of a carboxylic acid anhydride group]/([peak height of the carboxylic acid anhydride group]+[peak height of a carboxyl group]) in its infrared absorption analysis being at least 0.5, the Mooney viscosity being 15 to 200, and (d) the iodine value being at most 80 grams per 100 grams.

The carboxylated nitrile group-containing highly saturated copolymer rubber according to the present invention is a copolymer which has nitrile groups in its molecule, contains carbon-carbon unsaturated bonds in only a little amount and exhibits rubber elasticity, and also a rubber having carboxyl groups and carboxylic acid anhydride groups in its molecule.

The content of the carbon-carbon unsaturated bonds can be evaluated by its iodine value. The rubber according to the present invention has an iodine value of at most 80, preferably at most 60. If the iodine value exceeds 80, its oil resistance and heat resistance becomes insufficient. The iodine value is a value measured in accordance with JIS K 0070.

In the rubber according to the present invention, no particular limitation is imposed on its bound nitrile content. However, it is generally within a range of 10 to 60 wt. %, preferably 15 to 40 wt. %. The oil resistance and heat resistance of the rubber become higher as the bound nitrile content thereof increases, while the rubber elasticity thereof becomes higher as the bound nitrile content decreases. Accordingly, the bound nitrile content is suitably selected so as to well balance these physical properties with one another as necessary for the end application intended. The bound nitrile content is a value obtained in accordance with the Kjeldahl method.

The rubber according to the present invention has an acid equivalent of at least $1 \times 10^{-4}$ ephr, preferably $2 \times 10^{-3}$ to $5 \times 10^{-2}$ ephr, more preferably $5 \times 10^{-3}$ to $3 \times 10^{-2}$ ephr. The tensile strength and abrasion resistance of the resulting rubber becomes lower as the acid equivalent lessens. The acid equivalent is a value determined as an equivalent per 100 g of a rubber sample by dissolving the rubber sample in acetone, purifying the sample by reprecipitation from n-hexane, dissolving the rubber sample purified by the reprecipitation in pyridine, and then titrating the pyridine solution of the rubber sample with a 0.02N ethanol solution of potassium hydroxide using thymolphthalein as an indicator.

In the infrared absorption analysis of the rubber according to the present invention, the ratio of [peak height of a carboxylic acid anhydride group]/([peak height of the carboxylic acid anhydride group]+[peak height of a carboxyl group]), which is read and calculated out from its spectrum, amounts to least 0.5, preferably at least 0.7, more preferably at least 0.8. If this value is smaller than 0.5, such rubber becomes liable to undergo scorching, has insufficient abrasion resistance and shows a tendency for its compression strain to increase.

The rubber according to the present invention has a Mooney viscosity ($ML_{1+4}$, 100° C.) within a range of 15 to 200, preferably 30 to 150. If the Mooney viscosity of the rubber is too high, its milling processability becomes poor. If the Mooney viscosity of the rubber is too low, its durability under a high pressure becomes insufficient, and so such rubber becomes collapsible because its compression set becomes high, and its relaxation of compression becomes insufficient.

The content of methyl ethyl ketone-insoluble matter in the rubber according to the present invention is generally 10 wt. % or lower, preferably 5 wt. % or lower, more preferably 2 wt. % or lower. If the content of the methyl ethyl ketone-insoluble matter is too high, the forming and processing ability of such rubber becomes poor, and its tensile strength and elongation are also lowered. The content of the methyl ethyl ketone-insoluble matter is a value obtained by placing a rubber sample cut into small pieces in a wire basket of 80 mesh; immersing this basket for 48 hours in methyl ethyl ketone at ordinary temperature, drying solid matter remaining in the basket and then measuring the weight of the dry substance to express the weight of the dry substance to the weight of the rubber sample initially placed in the basket in terms of percentage.

No particular limitation is imposed on the production process of the carboxylated nitrile group-containing highly saturated copolymer rubber according to the present invention. However, a preferable process includes a process in which a nitrile group-containing highly saturated copolymer rubber and an ethylenically unsaturated dicarboxylic acid or an anhydride thereof are subjected to an ene-type addition reaction at a rubber temperature within a range of 200 to 280° C. in an internal hot kneader.

Nitrile Group-containing Highly Saturated Copolymer Rubber

The nitrile group-containing highly saturated copolymer rubber used in the present invention is generally a rubber obtained by hydrogenating carbon-carbon double bonds (unsaturated bonds) of the moiety of a conjugated diene unit of an ethylenically unsaturated nitrile-conjugated diene copolymer rubber to saturate the rubber to a high degree. However, any copolymer rubber not always hydrogenated may be used so far as it is a rubbery copolymer of an ethylenically unsaturated nitrile, a conjugated diene and another ethylenically unsaturated monomer and has an iodine value of at most 80 grams per 100 grams.

The nitrile group-containing highly saturated copolymer rubber has a bound nitrile content of generally 10 to 60 wt. %, preferably 15 to 40 wt. %, an iodine value of generally at most 80, preferably at most 60, more preferably at most 50 and a Mooney viscosity ($ML_{1+4}$, 100° C.) within a range of generally 10 to 300, preferably 15 to 200, more preferably 30 to 150.

If the iodine value of the starting rubber is too high, the heat resistance and strength of the resulting carboxylated rubber are lowered. No particular limitation is imposed on the lower limit of the iodine value. However, that having an iodine value of at least 1 is preferably used, since the resulting carboxylated rubber may become difficult to vulcanize in some cases if the iodine value is too low. If the Mooney viscosity is too low, the durability under a high pressure of the resulting carboxylated rubber becomes insufficient, so that the compression set and relaxation of compression are not sufficiently improved. If the Mooney viscosity of the rubber is too high, the milling processability of the resulting carboxylated rubber becomes poor.

An ethylenically unsaturated nitrile-conjugated diene copolymer used in the production of the nitrile group-containing highly saturated copolymer rubber can be generally obtained by polymerizing a monomer composition containing an ethylenically unsaturated nitrile and a conjugated diene.

Examples of the ethylenically unsaturated nitrile include acrylonitrile, methacrylonitrile, chloro-acrylonitrile and methoxyacrylonitrile. Of these, acrylonitrile is particularly preferably used. A proportion of the ethylenically unsaturated nitrile is generally 10 to 60 wt. % based on the monomer composition.

Examples of the conjugated diene include 1,3-butadiene, 2,3-dimethylbutadiene, isoprene, 1,3-pentadiene and chloroprene. Of these, 1,3-butadiene is particularly preferably used. A proportion of the conjugated diene is generally 40 to 90 wt. % based on the monomer composition.

When 1,3-butadiene and isoprene are used in (combination as a conjugated diene component (i.e., in the case of isoprene-butadiene-acrylonitrile copolymer rubber), contents of bound 1,3-butadiene and bound isoprene are generally 30 to 70 wt. % and 70 to 30 wt. %, respectively, based on the total weight of the bound conjugated diene components.

Other ethylenically unsaturated monomers copolymerizable with the ethylenically unsaturated nitrile and conjugated diene may be copolymerized within a range of generally 0 to 50 wt. %, preferably 0 to 30 wt. %, more preferably 0 to 20 wt. % with the monomer composition used in the present invention.

As examples of the other ethylenically unsaturated monomers, may be mentioned aromatic vinyl compounds such as styrene and α-methylstyrene; alkyl esters of (meth) acrylic acid, such as methyl acrylate, ethyl acrylate, butyl acrylate, propyl acrylate, methyl methacrylate, ethyl methacrylate, butyl methacrylate and propyl methacrylate; dialkyl esters of ethylenically unsaturated dicarboxylic acids, such as dimethyl maleate, diethyl maleate, dipropyl maleate, di-n-butyl maleate, diisobutyl maleate, di-n-pentyl dimaleate, di-n-hexyl maleate, di-2-ethylhexyl maleate, dimethyl fumarate, diethyl fumarate, dipropyl fumarate, di-n-butyl fumarate, diisobutyl fumarate, di-n-pentyl fumarate, di-n-hexyl fumarate, di-2-ethylhexyl fumarate, dimethyl itaconate, diethyl itaconate, dipropyl itaconate, di-n-butyl itaconate, diisobutyl itaconate, di-n-pentyl itaconate, di-n-hexyl itaconate, di-2-ethylhexyl itaconate, dimethyl citraconate, diethyl citraconate, dipropyl citraconate, di-n-butyl citraconate, diisobutyl citraconate, di-n-pentyl citraconate, di-n-hexyl citraconate, di-2-ethylhexyl citraconate, dimethyl mesaconate, diethyl mesaconate, dipropyl mesaconate, di-n-butyl mesaconate, diisobutyl mesaconate, di-n-pentyl mesaconate, di-n-hexyl mesaconate, di-2-ethylhexyl mesaconate, dimethyl glutaconate, diethyl glutaconate, dipropyl glutaconate, di-n-butyl glutaconate, diisobutyl glutaconate, di-n-pentyl glutaconate, di-n-hexyl glutaconate, di-2-ethylhexyl glutaconate, dimethyl allylmalonate, diethyl allylmalonate, dipropyl allyl-malonate, di-n-butyl allylmalonate, diisobutyl allyl-malonate, di-n-pentyl allylmalonate, di-n-hexyl allyl-malonate, di-2-ethylhexyl allylmalonate, dimethyl teraconate, diethyl teraconate, dipropyl teraconate, di-n-butyl teraconate, diisobutyl teraconate, di-n-pentyl teraconate, di-n-hexyl teraconate and di-2-ethylhexyl teraconate; alkoxyalkyl esters of ethylenically unsaturated carboxylic acids, such as methoxy acrylate, ethoxyethyl acrylate and methoxyethoxyethyl acrylate; cyano-substituted alkyl esters of ethylenically unsaturated carboxylic acids, such as α- and β-cyanoethyl acrylates, α-, β- and γ-cyanopropyl acrylates, cyanobutyl acrylate, cyanooctyl acrylate, α- and β-cyanoethyl methacrylates, α-, β- and γ-cyanopropyl methacrylates, cyanobutyl methacrylate and cyanooctyl methacrylate; hydroxyl group-substituted alkyl esters of ethylenically unsaturated carboxylic acids, such as 2-hydroxyethyl acrylate, hydroxypropyl acrylate, 2-hydroxyethyl methacrylate and hydroxypropyl methacrylate; ethylenically unsaturated amides such as acrylamide, methacrylamide, N-methylolacrylamide, N,N-dimethylolacrylamide, N-ethoxy-methylacrylamide, N-methylolmethacrylamide, N,N-dimethylolmethacrylamide and N-ethoxymethylmethacrylamide; nonconjugated dienes such as vinylnorbornene, dicyclopentadiene and 1,4-hexadiene; fluoroalkyl esters of ethylenically unsaturated carboxylic acids; and polymerizable antioxidants such as N-(4-anilinophenyl)-(meth) acrylamide, N-(4-anilinophenyl)cinnamamide, N-(4-anilinophenyl)crotonamide, N-(4-anilinophenyl)amino-2- hydroxypropyl (meth)allyl ether, 5-N-(4-anilinophenyl)-amino-2-hydroxypentyl amino-2-hydroxypentyl (meth)acrylate, 2-N-(4-anilino-phenyl)aminoethyl (meth)acrylate, N-[4-(methylanilino)-phenyl](meth)acrylamide, N-(4-anilinophenyl)maleimide, N-[4-(methylanilino)phenyl]maleimide, N-[4-(ethylanilino)-phenyl]maleimide and N-phenyl-4-(4-vinylbenzyloxy)-aniline.

Specific preferable examples of the ethylenically unsaturated nitrile-conjugated diene copolymer rubber include acrylonitrile-butadiene copolymer rubber (NBR), acrylonitrile-butadiene-isoprene copolymer rubber (NBIR), acrylonitrile-isoprene copolymer rubber (NIR). acrylonitrile-butadiene-butoxy acrylate copolymer rubber, acrylonitrile-butadiene-acrylic acid copolymer rubber and acrylonitrile-butadiene-methacrylic acid copolymer rubber. Of these, NBR is particularly preferred.

These ethylenically unsaturated nitrile-conjugated diene copolymer rubbers are generally prepared by copolymerizing an ethylenically unsaturated nitrile and a conjugated diene, and optionally another ethylenically unsaturated monomer in the presence of a radical polymerization initiator using a molecular weight modifier as needed.

As examples of the radical polymerization initiator, may be mentioned persulfates such as ammonium persulfate; azo compounds such as 4,4-azobis(4-cyanovaleric acid), 2,2-azobis(2-amidinopropane) dihydrochloride, 2,2-azobis-2-methyl-N-i,11-bis(hydroxymethyl)-2-hydroxyethyl-propioamide, 2,2'-azobis(2,4-dimethylvaleronitrile), 2,2'-azobisisobutyronitrile and 1,1'-azobis(l-cyclohexane-carbonitrile); and peroxides such as methyl ethyl peroxide, cumene peroxide, di-t-butyl peroxide, acetyl peroxide, dicumyl peroxide, lauroyl peroxide, benzoyl peroxide, t-butyl peroxy-2-ethylhexanoate, di-isopropyl peroxy-dicarbonate and di-t-butyl peroxyisophthalate. A redox initiator composed of a combination of any one of these polymerization initiators and a reducing agent may also be used.

The amount of the radical polymerization initiator used is generally within a range of 0.005 to 3 parts by weight per 100 parts by weight of the monomer composition. The polymerization temperature varies according to the kind of the radical polymerization initiator used. However, it is generally within a range of 0 to 100° C.

As examples of the molecular weight modifier, may be mentioned alkylthiol compounds such as 2,2',4,6,6'-pentamethylheptane-4-thiol, 2,4,4-trimethylpentane-2-thiol, dodecane-12-thiol, 2,2,6,6-tetramethylheptane-4-methanethiol, and 2,4,6-trimethylnonane-4-thiol; xanthogen disulfides such as dimethylxanthogen disulfide, diethyl-xanthogen disulfide and diisopropylxanthogen disulfide; thiuram disulfides such as tetramethylthiuram disulfide, tetraethylthiuram disulfide and tetrabutylthiuram disulfide; halogenated hydrocarbons such as carbon tetrachloride and ethylene bromide; hydrocarbons such as pentaphenylethane; and besides acrolein, methacrolein, allyl alcohol, 2-ethylhexyl thioglycolate, terpinolene, α-terpinene, γ-terpinene, dipentene, α-methylstyrene dimers (preferably, those having a 2,4-diphenyl-4-methyl-1-pentene content of at least 50 wt.*), 2,5-dihydrofuran, 3,6-dihydro-2H-pyran, phthalan, 1,2-butadiene and 1, 4-hexadiene. The amount of the molecular weight modifier used is generally within a range of 0.005 to 3 parts by weight per 100 parts by weight of the monomer composition.

No particular limitation is imposed on the polymerization process, and bulk polymerization, solution polymerization, suspension polymerization, emulsion polymerization or the like may be suitably selected as needed. Of these processes, the emulsion polymerization is preferred. In the case where the copolymer rubber is produced by the emulsion polymerization, copolymerization is conducted, for example, in accordance with a publicly known emulsion polymerization technique, and, for example, hydroxylamine or sodium carbamate is added to the reaction mixture at the time the prescribed conversion has been reached to terminate the polymerization reaction. Remaining monomers are then removed by heating, steam distillation or the like. A coagulant such as an inorganic coagulant, polymeric flocculent or heat-sensitive coagulant is added to a polymer latex obtained in such a manner, thereby coagulating and recovering a copolymer formed.

No particular limitation is imposed on the process for hydrogenating the moiety of a conjugated diene unit of the ethylenically unsaturated nitrile-conjugated diene copolymer rubber. The hydrogenation is preferably conducted by applying a process known per se in the art. More specifically, hydrogen is blown against the ethylenically unsaturated nitrile-conjugated diene copolymer rubber in the presence of a hydrogenation catalyst in a state that the rubber has been dissolved in a solvent, thereby conducting the hydrogenation.

The solvent is that capable of dissolving the ethylenically unsaturated nitrile-conjugated diene copolymer rubber therein. As specific examples of the solvent, may be mentioned aromatic compounds such as benzene, toluene, xylene and chlorobenzene; ketones such as cyclohexanone, acetone, methyl ethyl ketone and diethyl ketone; and besides tetrahydrofuran, ethyl acetate and dimethylformamide.

Examples of the hydrogenation catalyst include palladium/silica and palladium complexes (Japanese Patent Application Laid-Open No. 252405/1991). As the hydrogenation catalyst, there may also be used rhodium or ruthenium compounds described in, for example, Japanese Patent Application Laid-Open Nos. 125858/1987, 42937/1987, 45402/1989 and 45405/1989.

The reaction temperature of the hydrogenation is generally 5 to 150° C., preferably 10 to 100° C. If the reaction temperature is too high, the hydrogenation catalyst is deactivated, and side reactions become liable to occur. Examples of the side reaction include a reaction that the nitrile group is hydrogenated. The pressure of hydrogen upon the reaction is generally within a range of from atmospheric pressure to 150 kg/cm$^2$, preferably from atmospheric pressure to 100 kg/cm$^2$.

Ethylenically Unsaturated Dicarboxylic Acid or Anhydride Thereof

No particular limitation is imposed on the ethylenically unsaturated dicarboxylic acid or the anhydride thereof used in the present invention. Preferable examples of the ethylenically unsaturated dicarboxylic acid include maleic acid, fumaric acid, itaconic acid, citraconic acid, mesaconic acid, glutaconic acid, allylmalonic acid and teraconic acid. Preferable examples of the ethylenically unsaturated dicarboxylic acid anhydride include maleic anhydride, itaconic anhydride and citraconic anhydride. Of these, ethylenically unsaturated dicarboxylic acid anhydrides having 4 to 10 carbon atoms are preferred, with α,β-unsaturated dicarboxylic acid anhydrides being particularly preferred. More specifically, maleic anhydride is most preferred.

In the present invention, an ethylenically unsaturated monocarboxylic acid and/or a monoalkyl ester of an unsaturated dicarboxylic acid may be used in combination with the ethylenically unsaturated dicarboxylic acid or the anhydride thereof. When the ethylenically unsaturated monocarboxylic acid and/or the monoalkyl ester of the unsaturated dicarboxylic acid are used in combination, the amount of these compounds used is controlled in such a manner that the ratio of [peak height of the carboxylic acid anhydride group]/([peak height of the carboxylic acid anhydride group]+[peak height of the carboxyl group]) in the infrared absorption analysis of the resulting carboxylated rubber amounts to least 0.5, preferably at least 0.7, more preferably at least 0.8.

Examples of the ethylenically unsaturated monocarboxylic acid include acrylic acid and methacrylic acid. Examples of the monoalkyl ester of the unsaturated dicarboxylic acid include monomethyl maleate, monoethyl maleate, monopropyl maleate, mono-n-butyl maleate, monoisobutyl maleate, mono-n-pentyl maleate, mono-n-hexyl maleate, mono-2-ethylhexyl maleate, monomethyl fumarate, monoethyl fumarate, monopropyl fumarate, mono-n-butyl fumarate, monoisobutyl fumarate, mono-n-pentyl fumarate, mono-n-hexyl fumarate, mono-2-ethylhexyl fumarate, monomethyl itaconate, monoethyl itaconate, monopropyl itaconate, mono-n-butyl itaconate, monoisobutyl itaconate, mono-n-pentyl itaconate, mono-n-hexyl itaconate, mono-2-ethylhexyl itaconate, monomethyl citraconate, monoethyl citraconate, monopropyl citraconate, mono-n-butyl citraconate, monoisobutyl citraconate, mono-n-pentyl citraconate, mono-n-hexyl citraconate, mono-2-ethylhexyl citraconate, monomethyl mesaconate, monoethyl mesaconate, monopropyl mesaconate, mono-n-butyl mesaconate, monoisobutyl mesaconate, mono-n-pentyl mesaconate, mono-n-hexyl mesaconate, mono-2-ethylhexyl mesaconate, monomethyl glutaconate, monoethyl glutaconate, monopropyl glutaconate, mono-n-butyl glutaconate, monoisobutyl glutaconate, mono-n-pentyl glutaconate, mono-n-hexyl glutaconate, mono-2-ethylhexyl glutaconate, monomethyl allylmalonate, monoethyl allylmalonate, monopropyl allylmalonate, mono-n-butyl allylmalonate, monoisobutyl allylmalonate, mono-n-pentyl allylmalonate, mono-n-hexyl allylmalonate, mono-2-ethynhexyl allylmalonate, monomethyl teraconate, monoethyl teraconate, monopropyl teraconate, mono-n-butyl teraconate, monoisobutyl teraconate, mono-n-pentyl teraconate, mono-n-hexyl teraconate and mono-2-ethylhexyl teraconate.

Addition Reaction

In the present invention, the nitrile group-containing highly saturated copolymer rubber is additionally reacted with the ethylenically unsaturated dicarboxylic acid or the anhydride thereof in accordance with the process comprising the steps of:

(1) feeding the nitrile group-containing highly saturated copolymer rubber to an internal hot kneader and heating and kneading the rubber to control the temperature of the rubber within a range of 60 to 170° C., (2) feeding the ethylenically unsaturated dicarboxylic acid or the anhydride thereof to the kneader while the rubber temperature falls within the range of 60 to 170° C. to continue the kneading, and (3) controlling the rubber temperature within a range of 200 to 280° C. to additionally react the nitrile group-containing highly saturated copolymer rubber with the ethylenically unsaturated dicarboxylic acid or the anhydride thereof, thereby producing the carboxylated nitrile group-containing highly saturated copolymer rubber.

The first feature of the production process according to the present invention resides in that the nitrile group-containing highly saturated copolymer rubber is additionally reacted with the ethylenically unsaturated dicarboxylic acid or the anhydride thereof using the internal hot kneader. No particular limitation is imposed on the process of the addition reaction. However, a process in which the nitrile group-containing highly saturated copolymer rubber and the ethylenically unsaturated dicarboxylic acid or the anhydride thereof are kneaded under a high pressure without using any radical generator, thereby subjecting these reactants to an ene-type addition reaction. If a radical generator is used, the nitrile group-containing highly saturated copolymer rubber and the ethylenically unsaturated dicarboxylic acid or the anhydride thereof are easy to cause a radical-type addition reaction. According to the ene-type addition reaction, there is a bare possibility that gel formation and rise in the Mooney viscosity of the resulting carboxylated rubber may occur, and so preferable rubber can be obtained from the viewpoints of processability and various properties.

No particular limitation is imposed on the proportions of the nitrile group-containing highly saturated copolymer rubber and the ethylenically unsaturated dicarboxylic acid or the anhydride thereof to be used. However, the ethylenically unsaturated dicarboxylic acid or the anhydride thereof is used in a proportion of generally 0.05 to 10 parts by weight, preferably 0.2 to 6 parts by weight per 100 parts by weight of the nitrile group-containing highly saturated copolymer rubber.

The internal hot kneader used in the present invention may be optionally selected from among batch-wise internal hot kneaders such as a pressure kneader, a Banbury mixer and a Brabender mixer; and continuous kneaders such as a single-screw extruder, a same-direction rotating, twin-screw extruder and a different-direction rotating, twin screw extruder. Of these, the batch-wise internal hot kneaders are preferred, with the pressure kneader being particularly preferred. When a continuous kneader is used, the rubber remaining at the outlet of the extruder is liable to reach a high temperature, and so its temperature may exceed the optimum temperature range (from 200 to 280° C.) for the addition reaction in some cases. If the rubber is heated to a too high temperature, it may gel to cause the clogging of a die head in some cases. It is hence impossible to conduct the addition reaction with good efficiency. In addition, when the continuous kneader is used, a great amount of an unreacted ethylenically unsaturated dicarboxylic acid or anhydride thereof may remain in the rubber in some cases. It is hence necessary to strictly preset operating conditions (particularly, kneading conditions and temperature conditions).

When an open kneader, for example, an open roll mill or the like, is used in place of the internal hot kneader, a melt of the ethylenically unsaturated dicarboxylic acid or the anhydride thereof flies off. It is hence impossible to satisfactorily conduct the addition reaction.

The second feature of the production process according to the present invention resides in that the ethylenically unsaturated dicarboxylic acid or the anhydride thereof is added to the nitrile group-containing highly saturated copolymer rubber at the temperature at which an addition reaction (preferably, an ene-type addition reaction) does substantially not take place. More specifically, the nitrile group-containing highly saturated copolymer rubber is fed to the internal hot kneader and heated and kneaded to control the temperature of the rubber within a range of 60 to 170° C., preferably 100 to 150° C. (the first step). The ethylenically unsaturated dicarboxylic acid or the anhydride thereof is fed to the kneader while the rubber temperature falls within this temperature range to continue the kneading (the second step).

If the ethylenically unsaturated dicarboxylic acid or the anhydride thereof is added at the time the rubber temperature is extremely low, the rubber slips in the kneader, so that it is difficult to fully mix both components. If the rubber temperature is extremely high, a great amount of the ethylenically unsaturated dicarboxylic acid or the anhydride thereof may fly off in some cases, so that the rate of addition reaction is lowered. It is preferred that the nitrile group-containing highly saturated copolymer rubber be preliminarily kneaded with the ethylenically unsaturated dicarboxylic acid or the anhydride thereof in the second step, thereby uniformly dispersing the ethylenically unsaturated dicarboxylic acid or the anhydride thereof in the nitrile group-containing highly saturated copolymer rubber.

The third feature of the production process according to the present invention resides in that the rubber temperature is controlled within a range of 200 to 280° C. to additionally react the nitrile group-containing highly saturated copolymer rubber with the ethylenically unsaturated dicarboxylic acid or the anhydride thereof. In order to initiate the addition reaction after the preliminary kneading, it is necessary to raise the jacket temperature of the internal hot kneader to control the temperature (hereinafter may be referred to as "the rubber temperature" merely) of a mixture of the nitrile group-containing highly saturated copolymer rubber and the ethylenically unsaturated dicarboxylic acid or the anhydride thereof so as to fall within a range of 200 to 280° C., preferably 220 to 260° C. No particular limitation is imposed on a method for keeping the rubber temperature within this range. However, examples thereof include a method in which hot water is allowed to flow through the jacket of the kneader, and a method in which heat generated by shearing upon the kneading is utilized.

If the rubber temperature is extremely low at the time the addition reaction is conducted, the addition reaction is not allowed to sufficiently proceed. If the rubber temperature is extremely high, formation of gel and burned matter occurs. As a result, gel is liable to mix into a product.

The addition reaction may be either continuously conducted subsequently to the preliminary kneading or stepwise performed by separately kneading the mixture obtained by the preliminary kneading.

The jacket temperature of the internal hot kneader is within a range of generally 70 to 250° C., preferably 130 to 200° C. In the case where the heat generated by shearing is utilized, the addition reaction is conducted while controlling a shear rate upon the kneading by the kneader within a range of generally 30 to 1,000 $S^{-1}$, preferably 300 to 700 $S^{-1}$. If the shear rate is extremely high, it is difficult to control the rubber temperature by the heat generated by the shearing, so that the rubber temperature may exceed 280° C. in some cases, and thus formation of gel and burned matter occurs. Therefore, such a process is not preferred as an industrial production process. If the shear rate is extremely low, the rubber temperature does not reach 200° C., so that it cannot be expected to sufficiently conduct the addition reaction. In the production process of the present invention, it is preferred to utilize the heat generated by the shearing, since the rubber temperature can be controlled with ease. No particular limitation is imposed on the kneading time in the internal hot kneader. However, it is generally within a range of from 120 seconds to 120 minutes, preferably from 180 seconds to 60 minutes.

In the production process of the present invention, gelling of the rubber and extreme rise in its Mooney viscosity can be prevented by adding an antioxidant upon kneading the respective components in the internal hot kneader. No particular limitation is imposed on the kind of the antioxidant, and various kinds of antioxidants for rubber of the amine, amine-ketone, phenol, benzimidazole and other types may be used.

Examples of the amine type antioxidants include phenyl-1-naphthylamine, alkylated diphenylamines, octylated diphenylamine, 4,4-bis (α,α-dimethylbenzyl)-diphenylamine, p-(p-toluenesulfonylamido)diphenylamine, N,N-di-2-naphthyl-p-phenylenediamine, N,N-diphenyl-p-phenylenediamine, N-phenyl-N-isopropyl-p-phenylenediamine, N-phenyl-N-(1,3-dimethylbutyl)-p-phenylenediamine and N-phenyl-N-(3-methacryloyloxy-2-hydroxypropyl)-p-phenylene-diamine.

Examples of the amine-ketone type antioxidants include 2,2,4-trimethyl-1,2-dihydroxyquinoline and 6-ethoxy-1,2-dihydroxy-2,2,4-trimethylquinoline.

Examples of the phenol type antioxidants include 2,6-di-tert-butyl-4-methylphenol, 2,6-di-tert-butyl-4-ethylphenol, 2,2-methylenebis(4-ethyl-6-tert-butylphenol) 2,2-metlylenebis(4-methyl-6-tert-butylphenol), 4,4-butylidenebis(3-methyl-6-tertbutylphenol), 4,4-thiobis(3-methyl-6-tert-butylphenol), 2,5-di-tert-butylhydroquinone and 2,5-di-tert-amylhydroquinone.

Examples of the benzimidazole type antioxidants include metal salts of 2-mercaptobenzimidazole, 2-mercaptomethylbenzimidazole and 2-mercaptoethylbenzimidazole.

Of these antioxidants, the phenol type antioxidants are particularly preferably used. The amount of the antioxidant used is generally 0.01 to 5 parts by weight, preferably 0.1 to 2 parts by weight per 100 parts by eight of the nitrile group-containing highly saturated copolymer rubber.

According to the production process of the present invention, at least 80% of the charged amount of the ethylenically unsaturated dicarboxylic acid or the anhydride thereof used in the addition reaction can be added to the nitrile group-containing highly saturated copolymer rubber. According to the production process of the present invention, further, the amount of an unreacted ethylenically unsaturated dicarboxylic acid or anhydride thereof remaining in the rubber can be controlled to generally 10% or less, preferably 7% or less. Therefore, the process is extremely useful from the viewpoint of industrially stable production. The carboxylated nitrile group-containing copolymer rubber having such various properties as described above can be suitably produced by the production process of the present invention.

Rubber Composition

The rubber composition according to the present invention comprises the carboxylated nitrile group-containing highly saturated copolymer rubber and a crosslinking agent as essential components. As the crosslinking agent, there may be used any of sulfur type crosslinking agents and organic peroxide type crosslinking agents heretofore generally known as crosslinking agents for nitrile group-containing copolymer rubbers and nitrile group-containing highly saturated copolymer rubbers obtained by hydrogenating these rubbers.

Examples of the sulfur type crosslinking agent include various kinds of sulfur, such as sulfur powder, flower of sulfur, precipitated sulfur, colloidal sulfur, surface-treated sulfur and insoluble sulfur; sulfur-donating compounds such as sulfur monochloride, sulfur dichloride, morpholine disulfide, alkylphenol disulfides, N,N'-dithio-bis (hexahydro-2H-azepinone-2), phosphorus-containing polysulfides and high molecular polysulfides; and besides tetramethylthiuram disulfide, selenium dimethyldithiocarbamate, tellurium dimethyldithiocarbamate and 2-(4-morpholinodithio)benzothiazole.

Examples of the organic peroxide type crosslinking agents include organic peroxides such as t-butyl hydroperoxide, cumene hydroperoxide, di-tert-butyl peroxide, t-butylcumyl peroxide, 2,5-dimethyl-t-butyl peroxyhexane, 2,5-t-butyl peroxyhexane, 1,3-bis(t-butyl peroxyisopropyl)benzene, p-chlorobenzoyl peroxide, t-butyl peroxybenzoate, t-butyl peroxyisopropyl carbonate, t-butyl benzoate dicumyl peroxide, di(t-butyl peroxy)diisopropylbenzene, 2,5-di-t-butyl peroxy-2,5-dimethylhexane and benzoyl peroxide. A part of an organic peroxide type crosslinking agent may be replaced by a sulfur type crosslinking agent to use a combination thereof as a crosslinking agent.

The compounding proportion of the crosslinking agent may be suitably determined according to the kind of the crosslinking agent used and the degree of crosslinking desired. However, it is generally 0.001 to 30 parts by weight, preferably 0.01 to 15 parts by weight, more preferably 0.1 to 10 parts by weight per 100 parts by weight of the carboxylated nitrile group-containing highly saturated copolymer rubber.

In order to efficiently conduct a crosslinking reaction, a crosslinking aid or crosslinking accelerator may also be compounded in the rubber composition according to the present invention.

When a sulfur type crosslinking agent is used as a crosslinking agent, it is preferred to use in combination a crosslinking accelerator such as stearic acid; zinc oxide, active zinc, zinc peroxide, magnesium oxide; guanidine type crosslinking accelerator, aldehyde-amine type crosslinking accelerator, aldehyde-ammonia type crosslinking accelerator, thiazole type crosslinking accelerator, sulfenamide type crosslinking accelerator, thiourea type crosslinking accelerator or santate type crosslinking accelerator. When an organic peroxide type crosslinking agent is used as a crosslinking agent, it is preferred to use in combination a crosslinking aid such as a polyfunctional unsaturated compound such as trimethylolpropane trimethacrylate, divinylbenzene, ethylene glycol dimethacrylate, polyethylene glycol dimethacrylate, triallyl isocyanurate, triallyl cyanurate, diallyl phthalate, diallyl itaconate or triallyl trimellitate.

Other crosslinking accelerators or crosslinking aids include maleimide compounds such as maleimide and phenylenebismaleimide; polyvalent metal compounds such as zinc oxide, zinc peroxide, active zinc, zinc carbonate, magnesium oxide, lead monoxide, red lead and calcium hydroxide; and fatty acids and derivatives thereof such as stearic acid, oleic acid, lauric acid, zinc stearate and zinc laurate.

Of these, the polyvalent metal compounds and fatty acid derivatives are preferred, and the polyvalent metal salts of fatty acids are more preferred, with zinc stearate being particularly preferred. The use of these compounds makes it possible to improve the tensile strength and abrasion resistance of the rubber composition. It is further preferred to use the polyvalent metal salt of a fatty acid and the polyvalent metal compound (for example, zinc stearate and zinc oxide) in combination. The crosslinking accelerator and crosslinking aid may be compounded together with the crosslinking agent as components of the rubber composition according to the present invention.

The amount of the crosslinking aid or crosslinking accelerator added is suitably selected according to the kind and compounding proportion of the crosslinking agent used. However, it is generally 0.1 to 10 parts by weight, preferably 0.2 to 5 parts by weight per 1 part by weight of the crosslinking agent.

Into the rubber composition according to the present invention, may be optionally compounded any other rubber such as acrylic rubber, ethylene-acrylate rubber, ethylene-vinyl acetate copolymer rubber, chlorosulfonated polyethylene rubber, alkylated chlorosulfonated polyethylene rubber, chloroprene rubber, chlorinated polyethylene rubber, fluororubber, styrene-butadiene copolymer rubber, ethylene-propylene-diene terpolymer rubber, natural rubber or polyisoprene rubber so far as no detrimental influence is thereby imposed on the objects of the present invention. A liquid substance such as a liquid acrylonitrile-butadiene copolymer, polybutadiene or ethylene-propylene copolymer may also be compounded into the rubber composition according to the present invention.

Into the rubber composition according to the present invention, may be optionally added various kinds of additives such as antioxidants, fillers, reinforcing materials, conductivity-imparting agents, plasticizers, softening agents, foaming agents, tackifiers, anti-scorching agents, colorants, lubricants and dispersing agents.

The rubber composition according to the present invention may be formed into formed or molded products or composites, for example, rolls such as printing rolls, rolls for electrostatic image forming apparatus, and paper-feed rolls; hoses or tubes such as power steering hoses for automobiles, hydraulic hoses and fuel hoses; belts such as V-belts, poly-V-belts and toothed driving belts; tires; wire coating materials; sponges; and sheets, by crosslinking and forming or molding it as it is, or combining it with fibers.

The rubber composition according to the present invention may also be applied to uses such as damping materials (vibration proofing materials); spring materials; glare-proofing materials; sealing materials such as O-rings, gaskets and oil seals; sliding materials (friction materials) such as clutch plates and brake shoes for automobiles; and the like.

Composite

When the rubber composition according to the present invention is applied to application fields such as belts and hoses, it is preferred that it be formed into a composite combined with reinforcing fiber.

As examples of the fiber, may be mentioned synthetic fibers such as polyamide fiber, polyvinyl alcohol fiber, polyvinyl chloride fiber, polyvinylidene chloride fiber, polyacrylonitrile fibers, polyester fiber, polyethylene fiber, polypropylene fiber, polyurethane fiber, polyvinylidene fluoride fiber and polyfluoroethylene fiber; regenerated fibers such as cellulosic regenerated fibers (viscose rayon, cupro-ammonium rayon); semisynthetic fibers such as acetate; vegetable fibers such as cotton, kapok, flax, hemp, ramie, jute, Malila hemp, sisal and coconut; animal fibers such as wool, alpaca and silk; and inorganic fibers such as metal fibers, carbon fiber, glass fiber, rock fiber and slag fiber.

These fibers may be kneaded in the form of short or long fiber into the rubber composition. When they are used in the application fields of belts and hoses, it is however preferred that they are formed into a cloth (base cloth) such as a woven fabric or nonwoven fabric to combine the cloth with the rubber composition. More specifically, the composite includes a laminate obtained by laminating a sheet formed of the rubber composition on the base cloth, shaping the laminate in the desired form as needed, and then press-vulcanizing the shaped laminate. An untreated cloth may be used as the base cloth, but such a cloth may be surface-treated in order to improve its adhesion property to the rubber composition. Examples of the surface treatment include a method in which the base cloth is dipped in a hydrogenated acrylonitrile-butadiene rubber latex, and a method in which the base cloth is coated with a coupling agent.

EXAMPLES

The present invention will hereinafter be described more specifically by the following Examples and Comparative Examples. All designations of "part" or "parts" and "%" as will be used in these examples mean part or parts by weight and wt. % unless expressly noted.

An analytical method and evaluation methods of various physical properties will hereinafter be described.

(1) Acid Equivalent

After a carboxylated rubber sample (M g) was dissolved in acetone to purify the rubber sample by reprecipitation from n-hexane, the rubber sample purified by the reprecipitation is dissolved in pyridine (guaranteed reagent prescribed in JIS K 8777). The thus-obtained solution is titrated with a 0.02N ethanol solution of potassium hydroxide using thymolphthalein as an indicator to obtain a titre A (ml). On the other hand, another rubber sample (M g) before carboxylation was titrated in the same manner as described above to obtain a titre B (ml). An acid equivalent was calculated out from the measured values of these titres in accordance with the following equation:

Acid equivalent (ephr)=[(A−B)×0.02×100]/[1000×M]

Incidentally, B is substantially zero.

(2) Addition Rate of Carboxylic Acid

An addition rate of a carboxylic acid was determined in terms of a proportion of the added amount (obtained by converting the acid equivalent) of maleic anhydride to the charged amount thereof.

(3) Remaining Rate of Carboxylic Acid

A carboxylated rubber sample was dissolved in pyridine, and the resultant solution was titrated in the same manner as in the method for determining the acid equivalent using thymolphthalein as an indicator. A remaining rate of a carboxyl acid was determined by subtracting the added amount described above from the value obtained by the above titration to convert this difference to a proportion to the amount of maleic acid charged.

(4) Infrared Absorption Analysis

A measurement was conducted by means of an infrared absorption analyzer [Iris scanning type infrared microscopic system, manufactured by S. T. Japan K.K.].

Peaks of a carboxylic acid anhydride group and a carboxyl group appear at about 1785 cm$^{-1}$ and 1710–1740 cm$^{1}$, respectively.

(5) MEK-insoluble Matter

After a rubber sample cut into small pieces was placed in a wire basket of 80 mesh, and this basket was immersed for 48 hours in methyl ethyl ketone (MEK) at ordinary temperature, solid matter remaining in the basket was dried to measure the weight of the dry substance. A percentage of the weight of the dry substance to the weight of the rubber sample initially placed in the basket was found to regard it as MEK-insoluble matter.

(6) Curust Scorch Test

Scorch time ($T_{10}$), maximum torque ($V_{max}$) and minimum torque ($V_{min}$) were measured at 150° C. by means of an oscillating disk rheometer using about 10 g of an uncrosslinked rubber composition sample in accordance with The Society of Rubber Industry, Japan, Standard SRIS 3102. A shorter $T_{10}$ indicates that the crosslinking rate of a rubber composition sample is higher, and such rubber is easier to scorch. A greater $V_{max}$ indicates that the crosslinking efficiency of the rubber composition sample is higher.

(7) Tensile Test

A specimen was punched out of a sheet 2 mm thick of a crosslinked rubber sample using a No. 3 dumbbell. The punched specimen thus obtained was subjected to a tensile test under conditions of a cross-head speed of 500 mm/min, an interchuck distance of 20 mm, a temperature of 25° C. and a humidity of 50% RH (relative humidity) in accordance with JIS K 6301 to measure the stress at 300% elongation, tensile strength and elongation of the specimen.

(8) Pico Abrasion Test

An abrasion loss of a rubber composition sample was measured in accordance with ASTM D-2228-88. A smaller value of the abrasion loss indicates that the abrasion resistance of the rubber composition sample is higher.

(9) Adhesion Test to Fiber

A base cloth composed of fiber is laid on top of a sheet-like formed product of a rubber composition sample, and they were pressed for 30 minutes at a pressing pressure of 5 MPa and a temperature of 150° C. to crosslink the rubber composition, thereby obtaining a laminate (composite) of the base cloth and the rubber. A specimen of about the size of 25 mm×150 mm was pouched out of this composite and subjected to a peel test at a cross-head speed of 50 mm/min by means of an Instron type tensile tester.

As the base cloth, was used any one of ① a surface-treated nylon base cloth obtained by dipping a base cloth composed of nylon 66 fiber in a hydrogenated acrylonitrile-butadiene rubber latex and then subjecting the thus-dipped cloth to a heat treatment at 180° C. for 2 minutes, ② a surface-treated glass fiber base cloth obtained by dipping a base cloth composed of glass fiber in the hydrogenated acrylonitrile-butadiene rubber latex and then subjecting the thus-dipped cloth to a heat treatment at 180° C. for 2 minutes, and ③ a base cloth composed of nylon 66 fiber.

Example 1

One hundred parts of a nitrile group-containing highly saturated copolymer rubber (hydrogenated acrylonitrile-butadiene copolymer rubber; iodine value: 28, nitrite content: 36%. Mooney viscosity: 58) were masticated for 3 minutes by means of a pressure kneader (manufactured by Moriyama Mfg. Works, Ltd.; mixing quantity: 75 liters, MS system) which is an internal hot kneader.

At this time, steam was allowed to flow through jackets of the mixing chamber, side plate, pressurizing lid and blade shaft of the pressure kneader under a steam pressure of 3 kg/cm2 to heat the jackets to 130° C. The pressure kneader was operated at this temperature under conditions of the number of revolutions of a blade of 30/25 rpm, a pressure of the pressurizing lid of 8 kg/cm$^2$ and a shear rate of 500 S$^{-1}$. A packing rate within the pressure kneader was about 89.5 vol. % of the total volume of the pressure kneader.

After the temperature of the rubber was raised to 130° C., 1.8 parts of maleic anhydride heated and melted at 65° C.

and 0.5 parts of 2,6-di-tert-butyl-4-methylphenol (BHT) were poured into the pressure kneader by means of a plunger pump to successively knead (preliminarily knead) the resultant mixture.

The temperature of the rubber was controlled so as to reach 250° C. by utilizing heat generated by shearing caused by the kneading, and the mixture was kneaded further for 15 minutes at that temperature to conduct an ene-type addition reaction. The control of the rubber temperature was made by changing the temperature of water flowed through the jackets of the pressure kneader and/or changing the pressure of the pressurizing lid of the pressure kneader.

Finally, the kneading chamber of the pressure kneader was brought down, and dry mixing was conducted for about 30 seconds, whereby the rubber mixture is caused to fall down from the pressure kneader and taken out of the pressure kneader to obtain a carboxylated nitrile group-containing highly saturated copolymer rubber. No stain was observed on the blade of the pressure kneader.

The evaluation results of the carboxylated nitrile group-containing highly saturated copolymer rubber thus obtained are shown in Table 1.

Example 2

A carboxylated nitrile group-containing highly saturated copolymer rubber was obtained in the same manner as in Example 1 except that the amount of maleic anhydride added in Example 1 was changed to 0.7 parts. The evaluation results thereof are shown in Table 1.

Example 3

A carboxylated nitrile group-containing highly saturated copolymer rubber was obtained in the same manner as in Example 1 except that the amount of maleic anhydride added in Example 1 was changed to 3.5 parts. The evaluation results thereof are shown in Table 1.

Comparative Example 1

An autoclave was charged with a methyl ethyl ketone solution (concentration: 11%) of a nitrile group-containing highly saturated copolymer rubber (hydrogenated acrylonitrile-butadiene copolymer rubber; iodine value: 28, nitrile content; 36%, Mooney viscosity: 58), and maleic anhydride was added in a proportion of 30 parts per 100 parts of the rubber. Thereafter, a reaction was conducted at 95° C. for 4 hours while continuously adding a solution with 7 parts of benzoyl peroxide dissolved in methyl ethyl ketone in an inert gas atmosphere. The reaction product was purified by reprecipitation from a mixed solvent of n-hexane/diethyl ether. The evaluation results of the reaction product thus obtained are shown in Table 1.

Comparative Example 2

A raw material composed of 100 parts of a nitrile group-containing highly saturated copolymer rubber (hydrogenated acrylonitrile-butadiene copolymer rubber; iodine value: 28, nitrile content: 36%, Mooney viscosity: 58), 2 parts of maleic anhydride and 0.5 parts of BHT as an antioxidant was subjected to an ene-type addition reaction at a jacket temperature of 250 to 280° C. using a twin-screw extruder (BT-40, manufactured by Plastic Kogaku Kenkyusho K.K.; screw diameter: 38 mm, screw length: 1,600 mm, L/D: 42, screw shear rate: 2,000 $S^{-1}$, extrusion rate: 10 kg/h, composed of 7 barrels) as an internal hot kneader. The temperature of the rubber exceeded 300° C. Gelled rubber was mixed in a body into the modified rubber thus obtained. The evaluation results of the resultant modified rubber are shown in Table 1.

Comparative Example 3

A modified rubber was obtained in the same manner as in Example 1 except that the rubber temperature was changed from 250° C. in Example 1 to 180° C. The evaluation results of the modified rubber thus obtained are shown in Table 1.

TABLE 1

|  | Example | | | Comp. Example | | |
| --- | --- | --- | --- | --- | --- | --- |
|  | 1 | 2 | 3 | 1 | 2 | 3 |
| Kneading conditions: | | | | | | |
| Shear rate [$S^{-1}$] | 500 | 500 | 500 | — | 2000 | 500 |
| Rubber temprature [° C.] | 250 | 240 | 260 | 95 | 300 | 180 |
| Addition rate of carboxylic acid [%] | 89 | 86 | 80 | 6 | 45 | 3 |
| Kneading time [min] | 33 | 25 | 45 | 240 | 3 | 33 |
| Physical properties of rubber: | | | | | | |
| Acid equivalent × 10'[ephr] | 16.3 | 8.6 | 29.6 | 18.3 | 9.2 | 0.05 |
| Iodine value grams per 100 grams | 28 | 28 | 27 | 28 | 28 | 28 |
| Infrared absorption analysis (*1) | 0.96 | 0.94 | 0.89 | 0.45 | 0.09 | — |
| MEK-insoluble matter [%] | 0.2 | 0.3 | 0.5 | 7.1 | 11.2 | 0.4 |
| Bound nitrile content [%] | 36 | 36 | 36 | 36 | 36 | 36 |
| Mooney viscosity | 65 | 58 | 67 | 82 | 45 | 60 |
| Remaining rate of carboxylic acid [%] | 3 | 0 | 5 | 9 | 33 | 69 |

(*1) Infrared absorption analysis: Showing a ratio of [peak height of a carboxylic acid anhydride group]/([peak height of the carboxylic acid anhydride group] + [peak height of a carboxyl group]). With respect to Comparative Example 3, no measurement was conducted because the addition rate of the carboxylic acid was too low.

From the results shown in Table 1, it is understood that maleic anhydride-added hydrogenated acrylonitrile-butadiene copolymer rubbers, to which maleic anhydride used in the ene-type addition reaction has been added with extremely high efficiency, and which have a high ratio of [peak height of a carboxylic acid anhydride group]/([peak height of the carboxylic acid anhydride group]+[peak height of a carboxyl group]) and are substantially free of gel (contain 0.2 to 0.5% of MEK-insoluble matter), are obtained according to the production process of the present invention (Examples 1 to 3).

On the other hand, the addition rate of the carboxylic acid is very low in the case of the addition reaction making use of the autoclave (Comparative Example 1). In the case where the addition reaction was conducted at a high temperature (Comparative Example 2) by means of the twin-screw extruder, the addition rate of the carboxylic acid is low, and it was observed that foreign matter such as gel is mixed into the rubber. It is understood that in the rubbers obtained by the processes of Comparative Examples 1 and 2, almost all the maleic anhydride added undergoes ring opening and changes to a carboxyl group. In the case where the addition reaction was conducted at a low temperature (Comparative Example 3), the addition rate of the carboxylic acid is extremely low.

Example 4

A rubber composition was obtained by mixing 100 parts of the carboxylated nitrile group-containing highly saturated copolymer rubber obtained in Example 1, 50 parts of carbon black (FEF Carbon Asahi 60, product of Asahi Carbon Co., Ltd.), 10 parts of zinc oxide, 1 part of stearic acid, 10 parts of a trimellitic acid type plasticizer (Adekacizer C-8, product of Asahi Denka Kogyo K.K.), 1 part of an amine type antioxidant (Nowguard 445, product of Hercules Co.), 0.5 parts of sulfur powder (325 mesh), 1.5 parts of tetramethylthiuram disulfide and 1 part of N-cyclohexyl-2-benzothiazyl sulfenamide by rolls at a roll temperature of 25° C. This rubber composition was press-vulcanized at 150° C. The evaluation results of the rubber composition and a vulcanized product thereof are shown in Table 2.

Comparative Example 4

A rubber composition and a vulcanized product thereof were obtained in the same manner as in Example 4 except that the rubber obtained in Comparative Example 1 was used in place of the carboxylated nitrile group-containing highly saturated copolymer rubber obtained in Example 1. The evaluation results thereof are shown in Table 2.

Comparative Example 5

A rubber composition and a vulcanized product thereof were obtained in the same manner as in Example 4 except that the rubber obtained in Comparative Example 2 as used in place of the carboxylated nitrile group-containing highly saturated copolymer rubber obtained in Example 1. The evaluation results thereof are shown in Table 2.

TABLE 2

|  | Ex. 4 | Comp. Ex. 5 | Comp. Ex. 5 |
| --- | --- | --- | --- |
| Curust scorch test (150° C.): |  |  |  |
| MH ($V_{max}$) [kg/cm] | 19.6 | 20.1 | 16.4 |
| ML ($V_{min}$) [kg/cm] | 3.3 | 3.0 | 2.5 |
| $T_{10}$ [min] | 5.0 | 1.3 | 1.8 |
| Tensile test (Crosslinking conditions: 150° C., 30 min): |  |  |  |
| Tensile strength [kg/cm$^2$] | 214 | 194 | 188 |
| Elongation [%] | 450 | 420 | 480 |

TABLE 2-continued

|  | Ex. 4 | Comp. Ex. 5 | Comp. Ex. 5 |
| --- | --- | --- | --- |
| Tensile stress at 300% elongation [kg/cm$^2$] | 161 | 172 | 148 |
| Hardness (JIS A) | 76 | 77 | 70 |
| Abrasion loss [×10$^{-4}$ cc] | 25 | 49 | 55 |
| Adhesion test: |  |  |  |
| Surface-treated nylon base cloth [N/25 mm] | 315 | 250 | 235 |
| Surface-treated glass base cloth [N/25 mm] | 320 | 255 | 245 |
| Surface-untreated nylon base cloth [N/25 mm] | 185 | 100 | 85 |

Example 5

A rubber composition was obtained by mixing 100 parts of the carboxylated nitrile group-containing highly saturated copolymer rubber obtained in Example 1, 40 parts of carbon black (FEF Carbon Asahi 60, product of Asahi Carbon Co., Ltd.), 5 parts of zinc oxide, 2 parts of zinc stearate and 3 parts of 1,3-bis(3-butyl peroxyisopropyl)-benzene by rolls at a roll temperature of 25° C. This rubber composition was press-vulcanized at 170° C. The evaluation results of the rubber composition and a vulcanized product thereof are shown in Table 3.

Example 6

A rubber composition and a vulcanized product thereof were obtained in the same manner as in Example 5 except that no zinc stearate was used. The evaluation results thereof are shown in Table 3.

Comparative Example 6

A rubber composition and a vulcanized product thereof were obtained in the same manner as in Example 5 except that a carboxylated nitrile group-containing highly saturated copolymer rubber (iodine value: 29, Mooney viscosity: 57, acid equivalent: 19.7 ephr, ratio of [peak height of a carboxylic acid anhydride group]/([peak height of the carboxylic acid anhydride group]+[peak height of a carboxyl group]): 0, MEK-insoluble matter: 0.2%) obtained by hydrogenating an emulsion copolymer composed of 2 parts of acrylic acid, 36 parts of acrylonitrile and 62 parts of butadiene was used in place of the carboxylated nitrile group-containing highly saturated copolymer rubber used in Example 5. The evaluation results thereof are shown in Table 3.

TABLE 3

|  | Ex. 5 | Ex. 6 | Comp. Ex. 6 |
| --- | --- | --- | --- |
| Curust scorch test (170° C.): |  |  |  |
| MH ($V_{max}$) [kg/cm] | 18.6 | 19.8 | 19.8 |
| ML ($V_{min}$) [kg/cm] | 4.1 | 2.9 | 3.8 |
| $T_{10}$ [min] | 1.4 | 1.4 | 0.5 |
| Tensile test (Crosslinking conditions: 170° C., 20 min): |  |  |  |
| Tensile strength [kg/cm$^2$] | 325 | 295 | 274 |
| Elongation [%] | 400 | 400 | 450 |

TABLE 3-continued

|  | Ex. 5 | Ex. 6 | Comp. Ex. 6 |
|---|---|---|---|
| Tensile stress at 300% elongation [kg/cm$^2$] | 279 | 279 | 253 |
| Hardness (JIS A) | 73 | 72 | 75 |
| Abrasion loss [×10$^{-4}$ cc] | 26 | 32 | 62 |
| Adhesion test: |  |  |  |
| Surface-treated nylon base cloth [N/25 mm] | 315 | 290 | 270 |
| Surface-treated glass base cloth [N/25 mm] | 320 | 310 | 280 |
| Surface-untreated nylon base cloth [N/25 mm] | 165 | 180 | 95 |

Example 7

A rubber composition was obtained by mixing 100 parts of the carboxylated nitrile group-containing highly saturated copolymer rubber obtained in Example 2, 40 parts of carbon black (FEF Carbon Asahi 60, product of Asahi Carbon Co., Ltd.), 5 parts of zinc oxide, 2 parts of zinc stearate, 0.5 parts of sulfur powder (325 mesh), 1 part of stearic acid, 1.5 parts of tetramethylthiuram disulfide and 1 part of N-cyclohexyl-2-benzothiazyl sulfenamide by rolls at a roll temperature of 25° C. This rubber composition was press-vulcanized at 150° C. The evaluation results of the rubber composition and a vulcanized product thereof are shown in Table 4.

Example 8

A rubber composition and a vulcanized product thereof were obtained in the same manner as in Example 7 except that no zinc stearate was used. The evaluation results thereof are shown in Table 2.

Comparative Example 7

A rubber composition and a vulcanized product thereof were obtained in the same manner as in Example 7 except that a nitrile group-containing highly saturated copolymer rubber (hydrogenated acrylonitrile-butadiene copolymer rubber; iodine value: 28, nitrile content: 36%, Mooney viscosity: 58) was used in place of the carboxylated nitrile group-containing highly saturated copolymer rubber obtained in Example 2. The evaluation results thereof are shown in Table 4.

TABLE 4

|  | Ex. 7 | Ex. 8 | Comp. Ex. 7 |
|---|---|---|---|
| Curust scorch test (150° C.): |  |  |  |
| MH (V$_{max}$) [kg/cm] | 22.6 | 24.1 | 10.7 |
| ML (V$_{min}$) [kg/cm] | 4.4 | 4.1 | 3.2 |
| T$_{10}$ [min] | 4.6 | 4.9 | 3.6 |
| Tensile test (Crosslinking conditions: 150° C., 20 min): |  |  |  |
| Tensile strength [kg/cm$^2$] | 326 | 294 | 234 |
| Elongation [%] | 400 | 430 | 470 |
| Tensile stress at 300% elongation [kg/cm$^2$] | 265 | 223 | 146 |
| Hardness (JIS A) | 74 | 73 | 70 |
| Abrasion loss [×10$^{-4}$ cc] | 21 | 27 | 56 |
| Adhesion test: |  |  |  |
| Surface-treated nylon base cloth [N/25 mm] | 335 | 325 | 230 |
| Surface-treated glass base cloth [N/25 mm] | 345 | 325 | 250 |
| Surface-untreated nylon base cloth [N/25 mm] | 185 | 190 | 85 |

From the evaluation results shown in Tables 2 to 4, it is understood that the carboxylated nitrile group-containing highly saturated copolymer rubbers (Comparative Examples 4, 5 and 6), which contain a carboxylic acid anhydride group in a low proportion, undergo scorching judging from the relatively short time by T$_{10}$ in the Curust scorch test, and moreover are high in abrasion loss and low in tensile stress at 300% elongation. It is also understood that the uncarboxylated, hydrogenated acrylonitrile-butadiene copolymer rubber (Comparative Example 7) is low in tensile strength and tensile stress at 300% elongation, and high in abrasion loss.

On the other hand, it is understood that the carboxylated nitrile group-containing highly saturated copolymer rubbers (Examples 4 to 8) according to the present invention, which contain a carboxylic acid anhydride group in a high proportion, are hard to undergo scorching, high in tensile strength and the like, and low in abrasion loss. The carboxylated nitrile group-containing highly saturated copolymer rubbers (Examples 4 to 8) according to the present invention are also excellent in adhesion property to fiber (base cloth) when combined with the fiber into composites.

Example 9

A rubber composition and a vulcanized product thereof were obtained in the same manner as in Example 4 except that zinc peroxide was used in place of zinc oxide in Example 4, and 2 parts of zinc stearate were additionally used. The evaluation results thereof are shown in Table 5.

Comparative Example 8

A rubber composition and a vulcanized product thereof were obtained in the same manner as in Comparative Example 4 except that zinc peroxide was used in place of zinc oxide in Comparative Example 4, and 2 parts of zinc stearate were additionally used. The evaluation results thereof are shown in Table 5.

TABLE 5

|  | Ex. 9 | Comp. Ex. 8 |
|---|---|---|
| Curust scorch test (150° C.): |  |  |
| MH (V$_{max}$) [kg/cm] | 20.4 | 19.2 |
| ML (V$_{min}$) [kg/cm] | 3.1 | 3.0 |
| T$_{10}$ [min] | 5.3 | 3.8 |
| Tensile test (Crosslinking conditions: 150° C., 30 min): |  |  |
| Tensile strength [kg/cm$^2$] | 228 | 208 |
| Elongation [%] | 430 | 410 |
| Tensile stress at 300% elongation [kg/cm$^2$] | 182 | 180 |
| Hardness (JIS A) | 76 | 76 |
| Abrasion loss [×10$^{-4}$ cc] | 27 | 40 |

TABLE 5-continued

|  | Ex. 9 | Comp. Ex. 8 |
|---|---|---|
| Adhesion test: | | |
| Surface-treated nylon base cloth [N/25 mm] | 310 | 240 |
| Surface-treated glass base cloth [N/25 mm] | 310 | 250 |
| Surface-untreated nylon base cloth [N/25 mm] | 180 | 95 |

Industrial Applicability

The carboxylated nitrile group-containing highly saturated copolymer rubbers according to the present invention are hard to undergo scorching and hence excellent in forming or molding and processing ability. In addition, the carboxylated nitrile group-containing highly saturated copolymer rubbers according to the present invention are high in tensile strength, low in abrasion loss and strong in adhesion to fiber and thus can be suitably used in application fields such as belts and hoses, particularly, timing belts used in automobiles or the like, and fuel hoses.

According to the production process of the present invention, the carboxylated nitrile group-containing highly saturated copolymer rubbers described above can be obtained with high efficiency. In addition, according to the production process of the present invention, almost all the ethylenically unsaturated dicarboxylic acid or the anhydride thereof charged can be added to a nitrile group-containing highly saturated copolymer rubber, so that the amount of an unreacted ethylenically unsaturated dicarboxylic acid or anhydride thereof remaining in the rubber can be lessened. Therefore, the production process is useful from the viewpoint of industrially stable production.

According to the present invention, there are provided rubber compositions comprising the carboxylated nitrile group-containing highly saturated copolymer rubber and a crosslinking agent. According to the present invention, there are also provided composites comprising such a rubber composition and fiber combined with each other.

What is claimed is:

1. A carboxylated ethylenically unsaturated nitrile-conjugated diene copolymer rubber having the following physical properties:

(a) the acid equivalent being at least $1 \times 10^{-4}$ equivalents per hundred gram (ephr), (b) the ratio of [peak height of a carboxylic acid anhydride group]/([peak height of the carboxylic acid anhydride group]+[peak height of a carboxyl group]) in its infrared absorption analysis being at least 0.5, (c) the Mooney viscosity being 15 to 200, (d) the iodine value being at most 80 grams per 100 grams, and (e) the content of methyl ethyl ketone-insoluble matter in the rubber being 5 wt. % or lower.

2. The carboxylated ethylenically unsaturated nitrile-conjugated diene copolymer rubber according to claim 1, which is obtained by addition reaction of a nitrile group-containing saturated copolymer rubber having an iodine value of at most 80 with an ethylenically unsaturated dicarboxylic acid or an anhydride thereof.

3. The carboxylated ethylenically unsaturated nitrile-conjugated diene copolymer rubber according to claim 2, wherein the nitrile group-containing saturated copolymer rubber has a bound nitrile content within a range of 10 to 60 wt. %.

4. The carboxylated ethylenically unsaturated nitrile-conjugated diene copolymer rubber according to claim 2, wherein the nitrile group-containing saturated copolymer rubber is obtained by hydrogenating the moiety of a conjugated diene unit of an ethylenically unsaturated nitrile-conjugated diene copolymer.

5. The carboxylated ethylenically unsaturated nitrile-conjugated diene copolymer rubber according to claim 4, wherein the ethylenically unsaturated nitrile-conjugated diene copolymer is an acrylonitrile-butadiene copolymer.

6. The carboxylated ethylenically unsaturated nitrile-conjugated diene copolymer rubber according to claim 2, wherein the ethylenically unsaturated dicarboxylic acid or the anhydride thereof is an ethylenically unsaturated dicarboxylic acid anhydride having 4 to 10 carbon atoms.

7. The carboxylated ethylenically unsaturated nitrile-conjugated diene copolymer rubber according to claim 6, wherein the ethylenically unsaturated dicarboxylic acid anhydride having 4 to 10 carbon atoms is maleic anhydride.

* * * * *